2,813,827

DRILLING FLUIDS INCORPORATING DERIVATIVES OF LIGNITIC MATERIALS

Edgar I. Crowley, Pittsburgh, and Norman W. Franke, Penn Township, Allegheny County, Pa., assignors to Gulf Research & Development Company, Pittsburgh, Pa., a corporation of Delaware No Drawing. Application December 29, 1953, Serial No. 401,070

10 Claims. (Cl. 252—8.5)

This invention relates to drilling fluids such as are used in the drilling of wells with rotary drilling equipment. More especially, this invention pertains to drilling fluids incorporating substances derived from lignitic materials.

Broadly speaking, the researches conducted in connection with this invention have shown that products obtained by the hydrolysis of lignitic materials in aqueous alkaline media at elevated temperatures and at superatmospheric pressures are valuable for treating drilling fluids; particularly with respect to modifying viscosity and gel strength and reducing fluid loss characteristics.

The drilling fluids of this invention incorporate the products or derivatives of such products that are produced upon reacting lignitic materials with aqueous alkaline media at elevated temperatures and at superatmospheric pressures.

Inasmuch as the substances incorporated in the drilling fluids of this invention are believed to be definable only by the process by which they are made, a description of such process is hereinafter set forth.

Before describing the procedures by which the useful products of lignitic materials can be obtained, the term "lignitic materials" is meant to define class IV coals as set forth in the ASTM Specification of Coals by Rank, D–388–38.

The aqueous alkaline media to which reference has been made can comprise any aqueous solution of any basic compound or compounds, preferably inorganic, that will not interfere with the desired reactions. Representative of such compounds can be mentioned basic inorganic compounds of either alkali metals or alkaline earth metals, the former being preferred, especially sodium compounds. Specific examples of such compounds which can be used include NaOH, KOH, $Na_2CO_3$, $Ba(OH)_2$, $Ca(OH)_2$, etc.

In treating the lignitic materials, compounds of the above-defined character are employed in aqueous solution in preferably more than about 5 percent concentration by weight, and in an amount at least equal to about 5 and preferably more than about 10 percent by weight based on the amount of lignitic material treated. The treatment of the lignitic material comprises mixing the same with the aqueous solution and raising the mixture to a temperature of at least about 125° C., and preferably from about 150° C. to about 250° C., and maintaining such temperature for a period of time. During the time that the mixture is held at an elevated temperature, the mixture is maintained under at least sufficient pressure to maintain an aqueous liquid phase.

The time during which the mixture is maintained at the elevated temperature can be varied to an extent determined primarily by the temperature employed. Usually a time interval of about an hour is preferred; however, the employment of temperatures in the vicinity of the upper end of the stated temperature range will produce a significant yield of useful derivatives in as short a time as 5 minutes, while a longer time interval is preferred, even up to several hours, when temperatures in the vicinity of the lower end of the stated temperature range are employed.

In general, the best yields of the desired products are obtained when the reactions have been allowed to proceed at the elevated temperature for a time sufficient that not more than about 70 percent solids by weight based on the lignitic material remains undissolved at the end of the reaction time. In making such a determination, the solids are obtained by centrifuging for ten minutes at 1800 R. P. M.

The total or total liquid products, with all or part of the water removed, obtained by the above-described treatment of lignitic materials can be mixed with conventional drilling fluids to produce drilling fluids of this invention. However, it is preferred that the components therein that are particularly effective for treating drilling fluids be separated or concentrated.

Such separation or concentration of the particularly effective components contained in the total products produced by the above-described treatment of lignitic materials comprises removing the solids, such as unreacted lignitic materials and ash, from the total products by any suitable procedure, such as filtration or centrifuging, to obtain the liquid products. The liquid products are then acidified with a strong mineral acid to precipitate a solid acidic product that is then separated for incorporation in drilling fluid by any suitable procedure, such as filtration or centrifuging. In general, at least sufficient acid is used to neutralize substantially the basic compound originally used in treating the lignitic material, and it is preferred that at least sufficient acid be used that the resulting total free acidity (both organic and inorganic) be about one-half normal or greater. Among suitable acids that may be mentioned are hydrochloric acid, phosphoric acid, and sulfuric acid, the latter being preferred.

Exemplary of the above-described procedure for obtaining the substances incorporated in the drilling fluids of this invention, 80 grams of ground, dried, North Dakota lignite and 700 grams of 26 percent aqueous sodium hydroxide were charged to a pressure vessel. The pressure vessel was sealed and placed in a rocking furnace, wherein the vessel and its contents were heated to 200° C., and maintained at that temperature with rocking for 85 minutes, after which the vessel was cooled and its contents removed. The contents were then centrifuged to remove solids, such as unextracted lignite and ash, to obtain a liquid product.

The liquid product obtained was then mixed with 1000 gms. of 40 percent sulfuric acid, and the solid precipitate formed thereby was removed by centrifuging. The solid precipitate was then washed repeatedly with water, and thereafter dried and found to amount to 33.3 grams or 41.6 percent by weight of the amount of lignite used.

Drilling fluid samples incorporating various concentrations of the solid precipitate obtained as described above were made up from a drilling fluid comprising 300 grams of a Wyoming bentonite to 2700 ml. of tap water. In making up the samples, the solid precipitate referred to in Tables I and II as "lignitic derivatives," was dissolved in aqueous sodium hydroxide and the solution incorporated in the drilling fluid. Tables I and II set forth in tabulated form the properties of such samples of drilling fluid. The data of Table II was obtained upon adjusting the pH of the samples to approximately a value of 9.0.

Table I

| | Lignitic Derivatives, lb./bbl. | | | | | |
|---|---|---|---|---|---|---|
| | 0 | 0.1 | 0.2 | 0.4 | 0.7 | 1.0 |
| Stormer Viscosity (cps.) | 70.8 | 53.5 | 56.0 | 52.6 | 48.8 | 48.9 |
| Initial Gel Strength (gms.) | 18.0 | 3.0 | 2.0 | 5.0 | 2.0 | 0 |
| 10 Minute Gel Strength (gms.) | 65.0 | 30.0 | 24.0 | 27.0 | 27.0 | 29.0 |
| pH | 9.0 | 9.05 | 9.10 | 9.30 | 9.15 | 9.19 |
| Fluid Loss (ml.) | 10.5 | 10.4 | 10.5 | 10.0 | 9.6 | 8.8 |
| Filter Cake Thickness (inches) | 3/32 | 3/32 | 3/32 | 3/32 | 3/32 | 3/32 |

Table II

| | Lignitic Derivatives, lb./bbl. | | | | | |
|---|---|---|---|---|---|---|
| | 0 | 0.1 | 0.2 | 0.4 | 0.7 | 1.0 |
| Stormer Viscosity (cps.) | 70.3 | 55.2 | 56.6 | 52.9 | 55.0 | 54.0 |
| Initial Gel Strength (gms.) | 9.0 | 0 | 0 | 0 | 0 | 0 |
| 10 Minute Gel Strength (gms.) | 51.0 | 30.0 | 28.0 | 25.0 | 28.0 | 27.0 |
| pH | 9.0 | 9.0 | 9.0 | 9.0 | 8.8 | 8.8 |
| Fluid Loss (ml.) | 10.2 | 10.3 | 10.0 | 9.6 | 9.0 | 8.7 |
| Filter Cake Thickness (inches) | 3/32 | 4/32 | 3/32 | 3/32 | 3/32 | 3/32 |

In the preceding tables, as well as in the appended claims, the concentrations set forth as pounds per barrel refer to a 42 gallon barrel.

The lignitic derivatives produced and separated according to the procedure outlined above are very effective treating agents as may be seen upon inspection of the tables presented above, and can be economically produced from abundant domestic sources of the required raw materials. In general, it has been found that the lignitic derivatives produce results that are in some respects somewhat analogous and quite comparable to those obtained upon using quebracho, an imported conventional treating agent, as a treating agent.

While the use of the lignitic derivatives has been described in conjunction with water base drilling fluids, it is believed that they can also be used with beneficial results in what are known in the art as oil-in-water emulsion drilling fluids. In addition, drilling fluids incorporating the described lignitic derivatives can also be treated with conventional treating agents, such as weighting agents, starch, CMC, etc.

While the total amount of precipitated lignitic derivatives used in a drilling fluid can vary over rather wide limits, say between 1/10 to 20 pounds per barrel, with economics and the degree of beneficial results desired being the prime considerations; it is generally preferred that the total amount of lignitic derivatives employed be about 1/4 to about 5 pounds per barrel of drilling fluid.

Although the acidic precipitate was described as being first dissolved in a suitable solvent that will not destroy the treating properties thereof before being incorporated in the drilling fluid samples, it is believed that such dissolving operation can, at least in many instances, be omitted. Direct incorporation of the lignitic derivatives in conventional drilling fluids, it is believed, will be facilitated by the fact that most drilling fluids have pH values on the basic side, inasmuch as the lignitic derivatives are soluble in aqueous alkaline solutions.

It should also be mentioned that the step of removing solids prior to acidification can be omitted, however, such omission will result in dilution of the treating agent, and necessitate the use of large treating quantities.

The invention has been described in considerable detail in order to convey a full understanding thereof, and no inference of limited scope of invention should be drawn therefrom; attention being directed to the appended claims for ascertainment of the scope of the invention.

We claim:

1. A drilling fluid having incorporated therein a thinning amount of the total products obtained upon reacting a class IV coal with an aqueous alkaline solution at a temperature of about 125° C. to about 250° C. under a pressure sufficient to maintain an aqueous phase for a sufficient time that less than about 70 percent of the class IV coal remains undissolved.

2. The process of well-drilling comprising drilling while circulating in the borehole the drilling fluid defined in claim 1.

3. A drilling fluid having incorporated therein a thinning amount of the total liquid products obtained upon reacting a class IV coal with an aqueous alkaline solution at a temperature of about 125° C. to about 250° C. under a pressure sufficient to maintain an aqueous phase for a sufficient time that less than about 70 percent of the class IV coal remains undissolved.

4. The process of well-drilling comprising drilling while circulating in the borehole the drilling fluid defined in claim 3.

5. A drilling fluid having incorporated therein a treating agent; said treating agent being obtained by reacting a class IV coal with an aqueous alkaline solution at a temperature of about 125° C. to about 250° C. under a pressure sufficient to maintain an aqueous phase for a sufficient time that less than 70 percent of the class IV coal remains undissolved, removing solids from the liquid products of such reaction, acidifying said liquid products to obtain said treating agent as a precipitate.

6. The drilling fluid of claim 5, wherein said treating agent is incorporated in the drilling fluid in an amount of about 1/4 to about 5 pounds per barrel of drilling fluid.

7. The process of well-drilling comprising drilling while circulating in the borehole the drilling fluid defined in claim 5.

8. A drilling fluid having incorporated therein a treating agent; said treating agent being obtained by reacting a class IV coal with an aqueous alkaline solution at a temperature of about 125° C. to about 250° C. under a pressure sufficient to maintain an aqueous phase for a sufficient time that less than 70 percent of the class IV coal remains undissolved, acidifying the total products of such reaction to precipitate solid acids, and removing the solids from the resulting solution as said treating agent.

9. The drilling fluid of claim 8, wherein said treating agent is incorporated therein in an amount of about 1/4 to about 5 pounds per barrel of drilling fluid.

10. The process of well-drilling comprising drilling while circulating the drilling fluid defined in claim 8.

References Cited in the file of this patent

UNITED STATES PATENTS

| 2,620,300 | Given | Dec. 2, 1952 |
| 2,650,197 | Rahn | Aug. 25, 1953 |